US006822455B2

(12) United States Patent
Flanagan

(10) Patent No.: US 6,822,455 B2
(45) Date of Patent: Nov. 23, 2004

(54) MULTIPLE TRANSMITTER AND RECEIVER WELL LOGGING SYSTEM AND METHOD TO COMPENSATE FOR RESPONSE SYMMETRY AND BOREHOLE RUGOSITY EFFECTS

(75) Inventor: William D. Flanagan, Houston, TX (US)

(73) Assignee: Ultima Labs, Inc., Houston, TX (US)

( * ) Notice: Subject to any disclaimer, the term of this patent is extended or adjusted under 35 U.S.C. 154(b) by 49 days.

(21) Appl. No.: 10/237,439

(22) Filed: Sep. 9, 2002

(65) Prior Publication Data

US 2004/0046559 A1 Mar. 11, 2004

(51) Int. Cl.$^7$ ................................................ G01V 3/12
(52) U.S. Cl. ....................................................... 324/338
(58) Field of Search ............................... 321/338–343; 702/7, 11

(56) References Cited

U.S. PATENT DOCUMENTS

| | | | | | |
|---|---|---|---|---|---|
| 4,451,789 A | * | 5/1984 | Meador | ....................... | 324/338 |
| 4,609,873 A | * | 9/1986 | Cox et al. | .................... | 324/338 |
| 4,949,045 A | * | 8/1990 | Clark et al. | ................. | 324/338 |
| 4,968,940 A | * | 11/1990 | Clark et al. | ................. | 324/338 |
| 5,594,343 A | * | 1/1997 | Clark et al. | ................. | 324/338 |
| 6,184,685 B1 | * | 2/2001 | Paulk et al. | ................ | 324/338 |
| 6,304,086 B1 | * | 10/2001 | Minerbo et al. | ............ | 324/338 |
| 6,353,321 B1 | * | 3/2002 | Bittar | ......................... | 324/338 |
| 6,476,609 B1 | * | 11/2002 | Bittar | ......................... | 324/338 |
| 6,538,447 B2 | * | 3/2003 | Bittar | ......................... | 324/338 |
| 6,541,979 B2 | * | 4/2003 | Omeragic | ................... | 324/339 |

* cited by examiner

Primary Examiner—Jay Patidar
(74) Attorney, Agent, or Firm—Domingue & Waddell, PLC

(57) ABSTRACT

The invention provides a system for determining geologic formation resistivity while drilling and a new method providing compensation for the vertical asymmetries of the tool response and the effects of borehole rugosity. The apparatus and method allows the construction of a tool body considerably shorter in length than previous devices and provides more radial depths of investigation for a given number of transmitter and receiver antennas when compared to previous devices. A method for calibrating data acquisition errors of the system is also described.

18 Claims, 10 Drawing Sheets

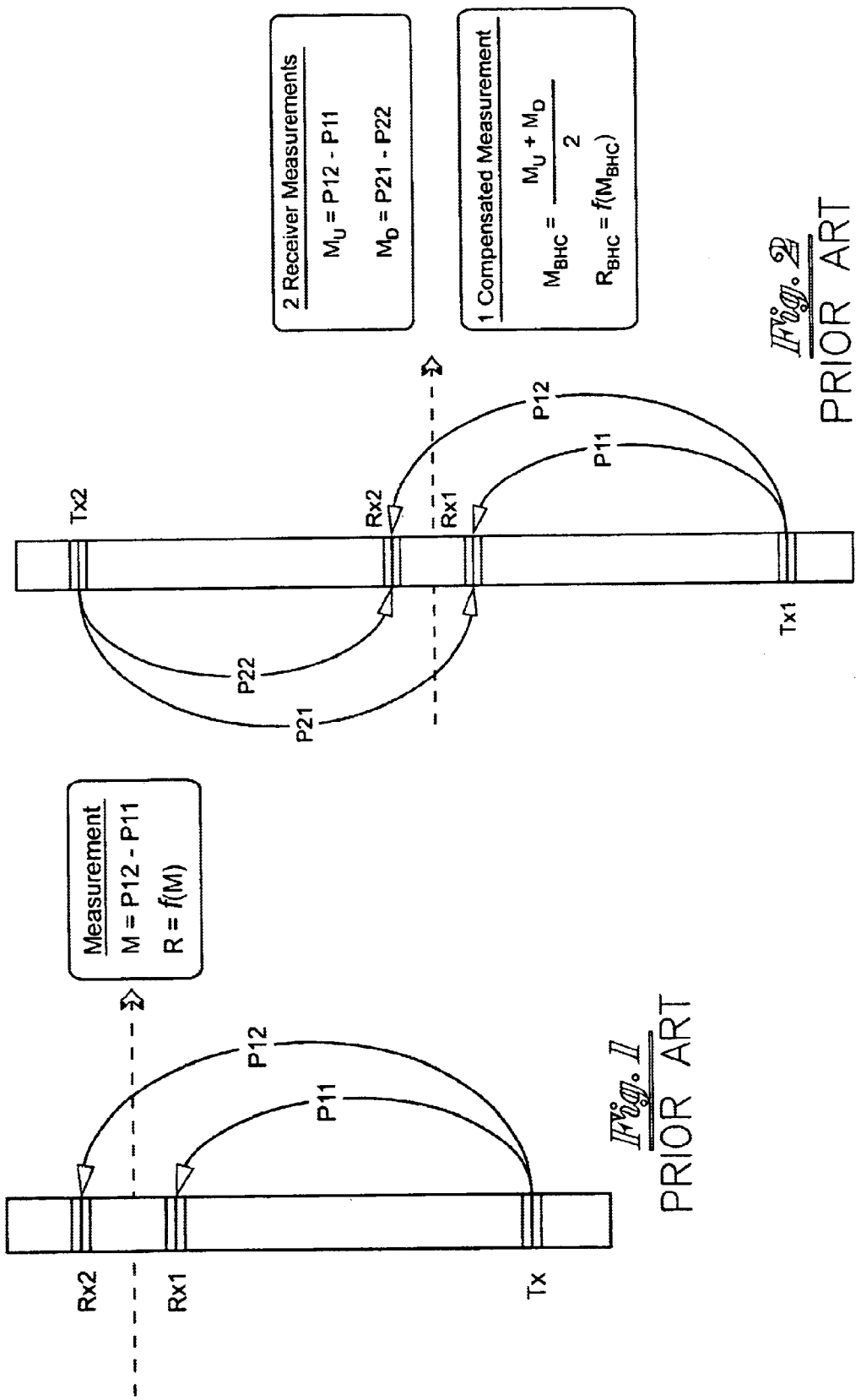

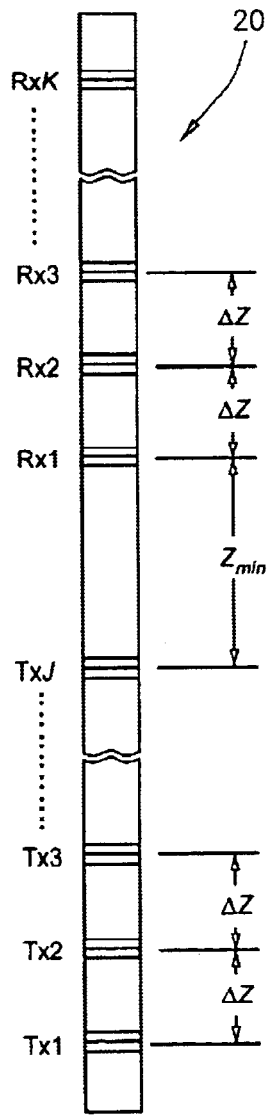

Total Number of Transmitters = $J$

Total Number of Receivers = $K$

Total Number of TxRx Pairs   $N_{TR} = J \times K$

Number of Unique TxRx Spacings   $NS_{TR} = J + K - 1$

Number of Unique TxRxRx Spacings   $NS_{TRR} = J + K - 2$

Number of Unique RxTxTx Spacings   $NS_{RTT} = NS_{TRR}$

Unique Spacings for TxRx Pairs $$ZTR_n = Z_{min} + (n \times \Delta Z) \; ; \; n = 0,1...(NS_{TR}-1)$$

Unique Spacings for Tx to RxRx pair midpoints $$ZTRR_n = Z_{min} + \frac{\Delta Z}{2} + (n \times \Delta Z) \; ; \; n = 0,1...(NS_{TRR}-1)$$

Fig. 5

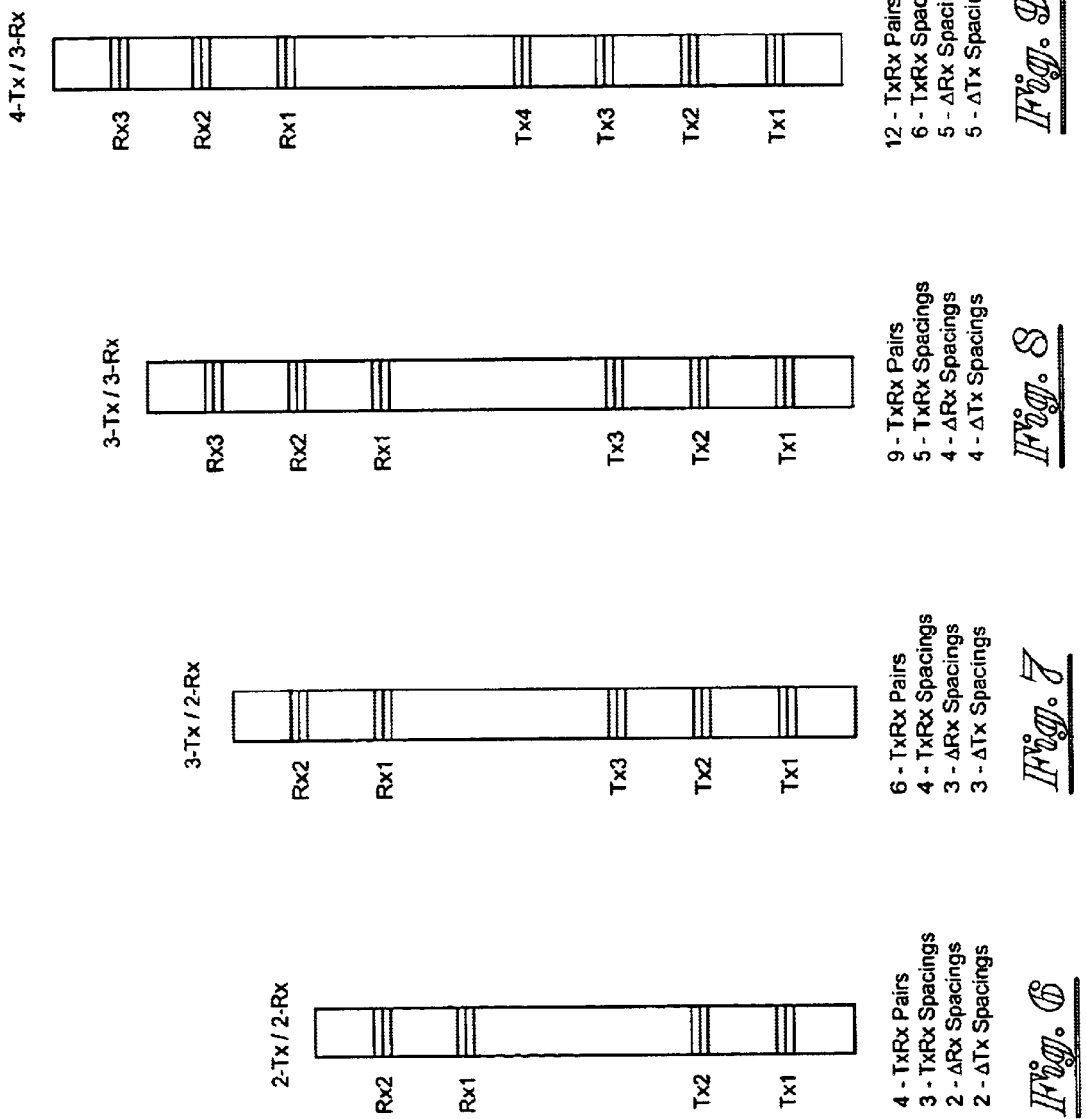

MULTIPLE TRANSMITTER AND RECEIVER WELL LOGGING SYSTEM AND METHOD TO COMPENSATE FOR RESPONSE SYMMETRY AND BOREHOLE RUGOSITY EFFECTS

BACKGROUND OF THE INVENTION

This invention relates to the field of well logging. More specifically, the invention relates to a novel apparatus and technique for measuring the resistivity of geologic formations surrounding a borehole during well logging and logging while drilling operations.

Formation resistivity is commonly used to evaluate geologic formations surrounding a borehole. Formation resistivity indicates the presence of hydrocarbons in the geologic formations. Porous formations having high resistivity generally indicate that they are predominantly saturated with hydrocarbons, while porous formations with low resistivity indicate that such formations are predominantly saturated with water. "Borehole rugosity" refers to borehole irregularities created by washouts, caves or other borehole wall features which deviate from a smooth borehole wall surface.

Devices have been previously developed for measuring formation resistivity. Many of these devices measure formation resistivity by measuring the properties of propagating electromagnetic waves. For example, FIG. 1 shows an early generation, uncompensated propagation wave resistivity tool comprising one transmitter and two receivers for measuring the properties of an electromagnetic wave over two propagation paths. Property P11 represents an electromagnetic propagation property for the propagation path from transmitter (Tx) to a first receiver (Rx1), and P12 represents the same electromagnetic propagation property as used for P11 but for the propagation path from the transmitter to a second receiver (Rx2). Typically the propagation properties measured are attenuation and phase. A differential measurement (M) is formed by taking the difference between P12 and P11. This difference allows any errors related to the transmitter elements of the system to be removed from the final measurement (M). The measurement (M) is then converted to formation resistivity (R) via function (f) which provides the relationship between the differential propagation property (M) and the resistivity of the surrounding formation.

FIG. 2 illustrates another propagation wave resistivity tool described in U.S. Pat. No. 4,949,045 to Clark et al. (1990) and in U.S. Pat. No. 4,968,940 to Clark et al. (1990). This tool provided improved measurement accuracy and reduced sensitivity to the effects of borehole irregularities when compared to the "uncompensated" tool shown in FIG. 1. Such tool comprised two transmitters and a receiver pair located between the two transmitters and is known as a borehole compensated tool. $M_U$ represents the differential measurement for the upward propagating electromagnetic wave from transmitter (Tx1) and $M_D$ represents the differential measurement for the downward propagating electromagnetic wave from transmitter (Tx2). A borehole compensated measurement $M_{BHC}$ can be calculated by averaging the upward propagating measurement, $M_U$, and the downward propagating measurement, $M_D$. The formation resistivity is determined in a fashion similar to the uncompensated tool by converting propagation property ($M_{BHC}$) to resistivity with function (f). By averaging the measurements from the upward and downward propagating electromagnetic waves, the effects of borehole rugosity on the measured formation resistivity can be reduced. This average also removes errors corresponding to the two receiver elements of the system, Rx1 and Rx2. Like the uncompensated device, the borehole compensated device also eliminates the errors related to the transmitting elements of the system by using differential receiver measurements, $M_U$ and $M_D$.

Although borehole compensated tools provide a more accurate measurement of formation resistivity than conventional uncompensated tools, such technique requires a tool approximately twice as long as an uncompensated tool. Tool length for an uncompensated tool with a single radial depth of investigation is directly related to the spacing between the transmitter and receiver pair. Longer spacings between the transmitter and receiver pair provide greater depth of investigation than shorter spacings and require a longer tool body accordingly. The tool length for a borehole compensated tool as described in patents '045 and '940 with an equivalent radial depth of investigation as an uncompensated tool will be approximately twice as long because of the requirement of both upper and lower transmitter elements.

Another compensated tool was described in U.S. Pat. No. 5,594,343 to Clark et al. (1997) wherein the transmitters were asymmetrically located on both sides of a receiver pair. Similar to the '045 and '940 patents previously described, such tool also required placement of at least one transmitter on each side of the receiver pair and also required a long tool body.

The compensated tools described above require a long tool body in the borehole to correctly position the transmitters and receivers. Long well tools not only require additional material and greater manufacturing cost but are more likely to bind or stick in narrow or deviated boreholes. This problem is particularly acute in multilateral wellbores having a reduced entry radius and in highly deviated wellbores. Accordingly, a need exists for an improved system capable of facilitating tool movement within a wellbore while gathering useful information regarding geologic formation characteristics such as resistivity and other geologic formation indicators.

SUMMARY OF THE INVENTION

The invention provides a system for evaluating a geologic formation property proximate to a borehole through such formation. The system comprises a tool body moveable through the borehole, a first transmitter engaged with the tool body for generating a signal into the geologic formation, a second transmitter engaged with the tool body proximate to the first transmitter for generating a signal into the geologic formation, a first receiver engaged with the tool body for receiving signals generated by the first and second transmitters, and a second receiver engaged with the tool body proximate to the first receiver for receiving signals generated by the first and second transmitters.

Another embodiment of the invention provides an apparatus comprising a tool body moveable through the borehole, a first transmitter engaged with the tool body for generating an electromagnetic wave into the geologic formation, a second transmitter engaged with the tool body proximate to the first transmitter for generating an electromagnetic wave into the geologic formation, a first receiver engaged with the tool body for receiving electromagnetic wave energy generated by the first and second transmitters and for generating electrical signals representing the electromagnetic wave energy, a second receiver engaged with the tool body proximate to the first receiver for receiving electromagnetic wave energy generated by the first and second transmitters and for generating electrical signals representing the electromagnetic wave energy, and a controller for processing the electrical signals generated by the first and second receivers.

The method of the invention comprises the steps of deploying a tool body in the borehole, of generating electromagnetic wave energy from the first transmitter at a selected location in the borehole, of generating electromagnetic wave energy from the second transmitter at a selected location in the borehole, of operating the first and second receivers in response to the electromagnetic waver energy generated by the first and second transmitters to generate electrical signals representing the electromagnetic waveenergy, and of transmitting said electrical signals to the controller.

BRIEF DESCRIPTION OF THE DRAWINGS

FIG. 1 illustrates a conventional uncompensated propagation wave resistivity tool.

FIG. 2 illustrates a form of a conventional compensated propagation wave resistivity tool.

FIG. 5 illustrates a depth-aligned compensated tool.

FIGS. 6 through 9 illustrate different transmitter and receiver configurations for a depth-aligned compensated propagation wave resistivity tool.

DESCRIPTION OF THE PREFERRED EMBODIMENTS

Figure 3:
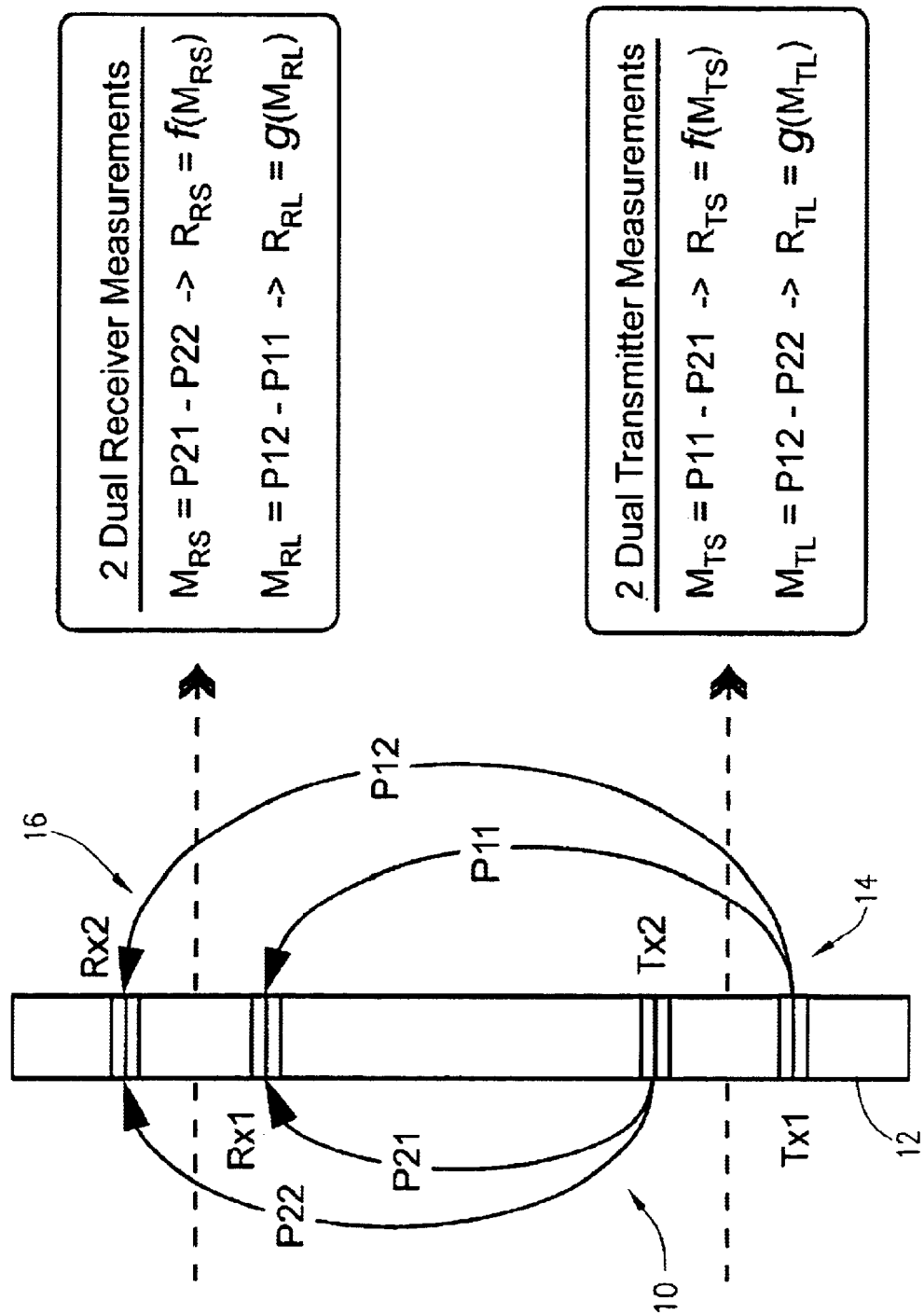
FIG. 3 illustrates a schematic view of a propagation wave resistivity system.

The invention provides a unique propagation wave resistivity system. The system is capable of providing two depths of investigation as shown in FIG. 3. Tool 10 comprises tool body 12 carrying two transmitters identified as transmitter pair 14 and two receivers identified as receiver pair 16. First transmitter Tx1 is located proximate to second transmitter Tx2. Located at a selected distance from transmitter pair 14 are first receiver Rx1 and second receiver Rx2.

Property P11 illustrates the electromagnetic property of the propagation path from first transmitter Tx1 to first receiver Rx1. Property P12 illustrates the electromagnetic property of the propagation path from first transmitter Tx1 to second receiver Rx2. Similar properties are illustrated for second transmitter Tx2, wherein property P21 illustrates the propagation path from second transmitter Tx2 to first receiver Rx1, and P22 illustrates the propagation path from second transmitter Tx2 to second receiver Rx2.

Tool 10 provides two differential measurements (MRS and $M_{RL}$) from receiver pair 16. $M_{RS}$ is derived from receiver pair 16 using short-spaced transmitter Tx2 and $M_{RL}$ is derived from receiver pair 16 using long-spaced transmitter Tx1. Both of these measurements can be converter to resistivity with functions $f$ and $g$.

In addition to the two dual-receiver measurements ($M_{RS}$ and $M_{RL}$), two additional differential measurements ($M_{TS}$ and $M_{TL}$) can be made from transmitter pair 14. $M_{TS}$ is derived from transmitter pair 14 using short-spaced receiver Tx2, and $M_{TL}$ is derived from transmitter pair 14 using long spaced transmitter Tx1. If the spacing between transmitter pair 14 is equal to the spacing of receiver pair 16, the functions to convert the dual-transmitter measurements, $M_{TS}$ and $M_{TL}$, into resistivity can be the same functions ($f$ and $g$) for the dual-receiver measurements from receiver pair 16.

One advantage of this inventive embodiment over a standard borehole compensated device shown in FIG. 2 is that the invention provides two different spacings and two different depths of investigation. Borehole rugosity effects are reduced in this new embodiment by using both the receiver pair 16 measurements and the transmitter pair 14 measurements. This new method of compensation is accomplished by depth shifting to align in depth the data from transmitter pair 14 with the data from receiver pair 16 as illustrated by FIG. 4.

Figure 4:
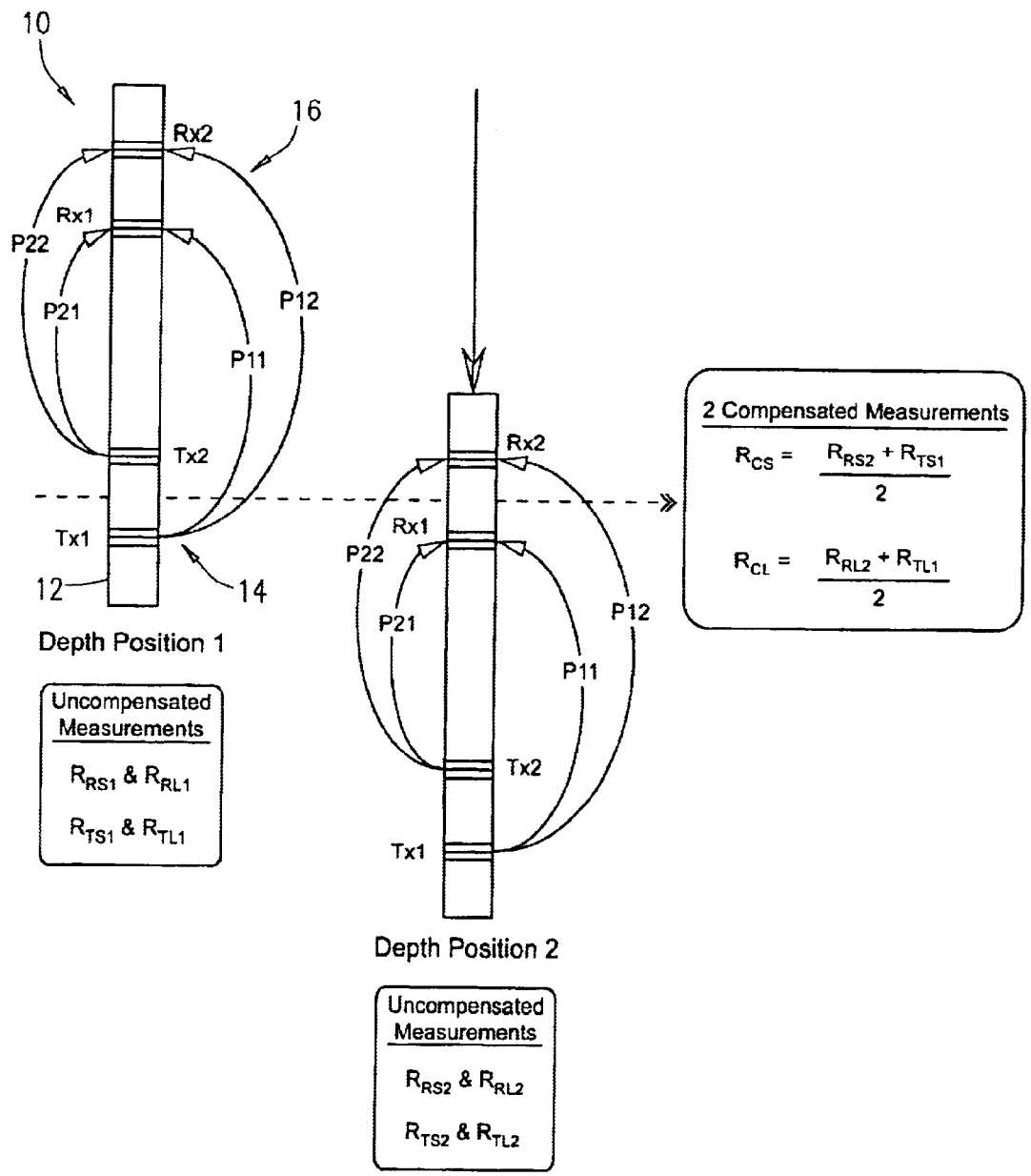
FIG. 4 illustrates a schematic view of two depth positions leading to compensated measurements.
Figure 4A:
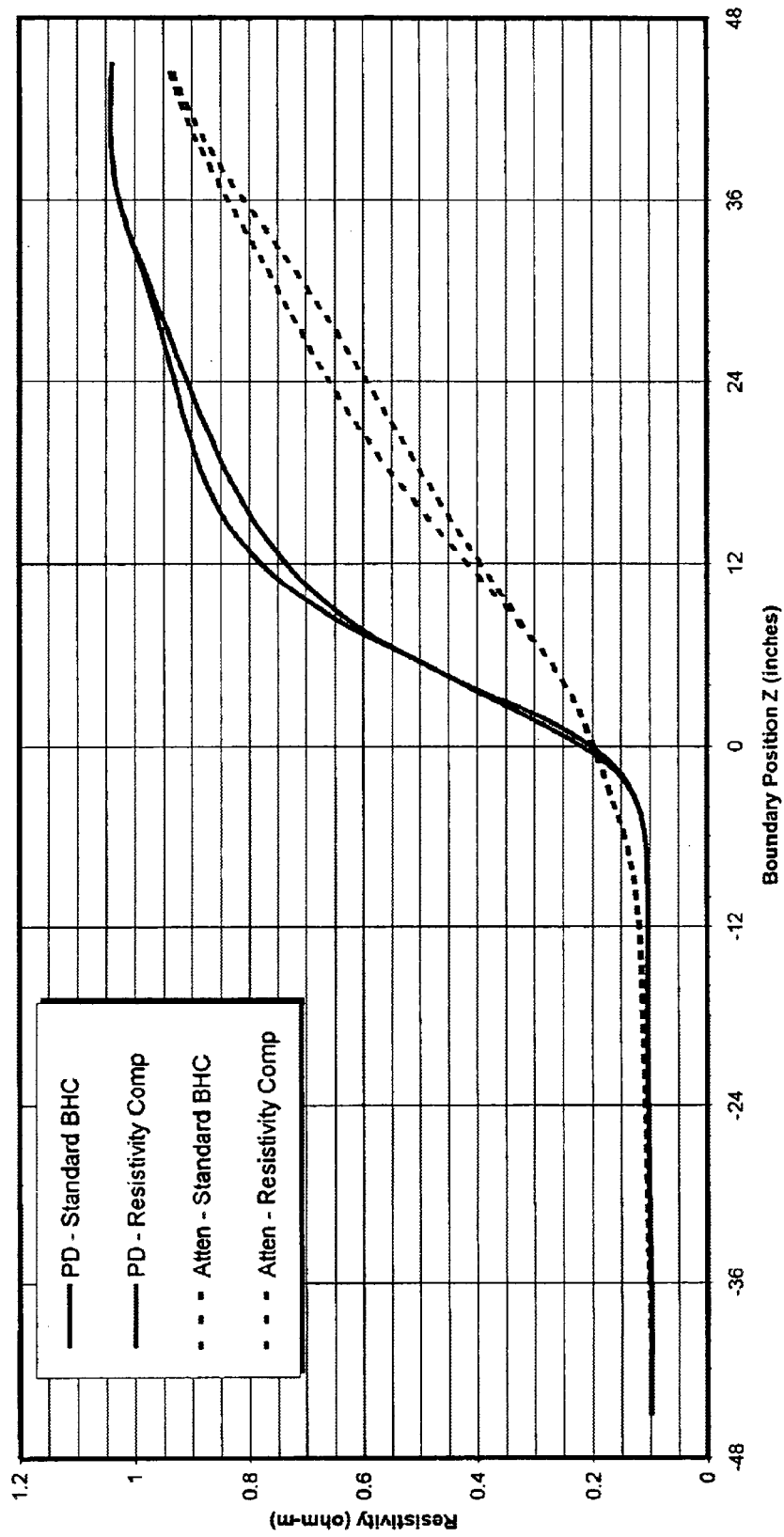
FIG. 4a illustrates the reduction of borehole rugosity effects with a compensated tool.
Figure 4B:
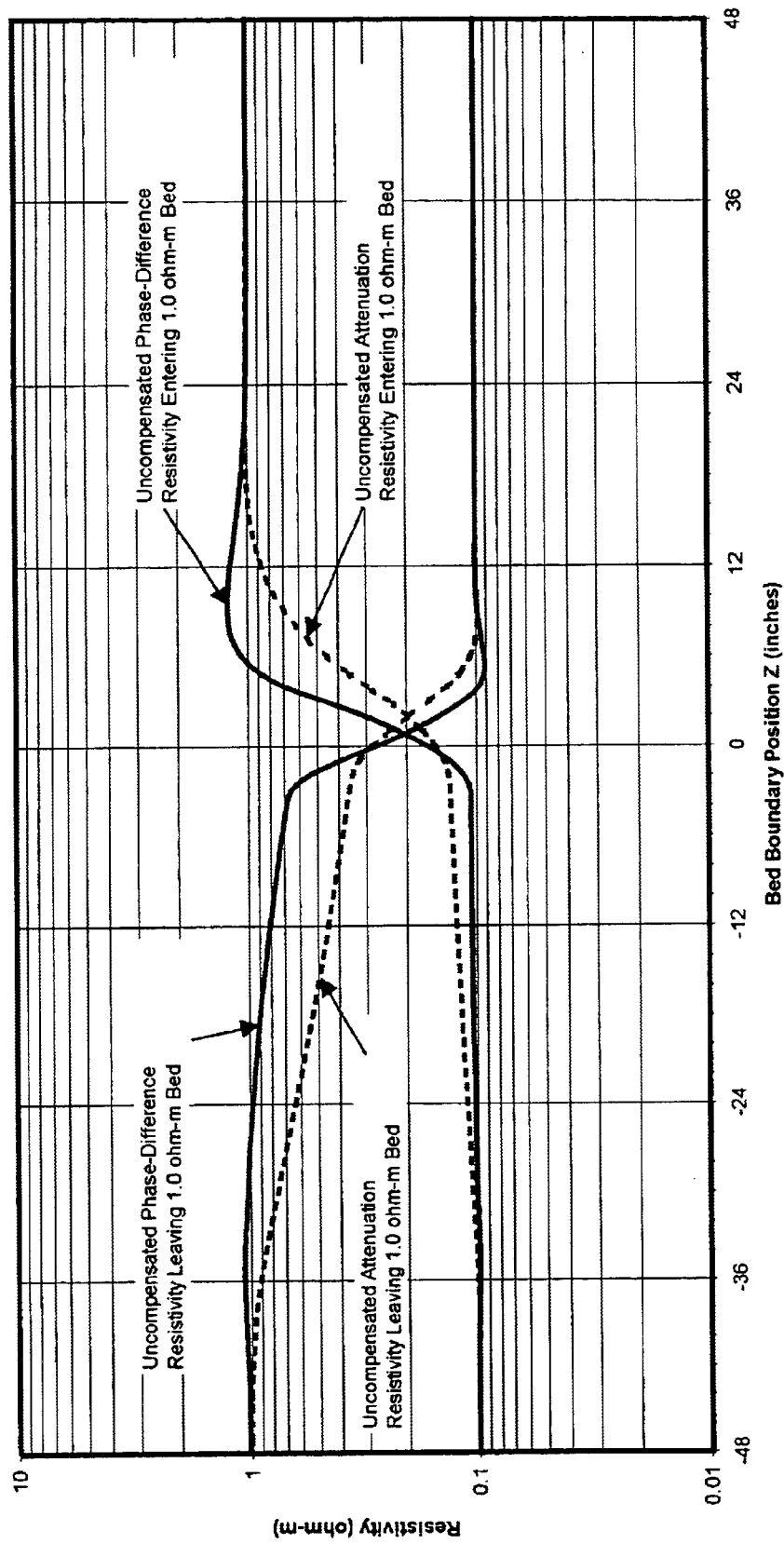
FIG. 4b illustrates the asymmetrical vertical response of an uncompensated tool.

As shown in FIG. 4, an average of receiver pair 16 measurements can be made with transmitter pair 14 measurements to obtain two compensated resistivity measurements. This compensated measurement will have reduced borehole rugosity effects similar to conventional borehole compensated devices. In this manner the invention accomplishes borehole compensation in an apparatus having a tool body significantly shorter than a standard borehole compensated device. In addition, two measurements with different depths of investigation are provided instead of the single depth of investigation provided with a conventional borehole compensated device. As used herein, the term "depth-aligned compensation" is used to describe a compensation method using depth aligned receiver pair 16 and transmitter pair 14 data. FIG. 4 illustrates how the measurements from receiver pair 16 and transmitter pair 14 can be averaged to produce a compensated resistivity. This process can be accomplished by averaging the dual-transmitter propagation measurements with the dual-receiver propagation measurements and then transforming the average measurements into resistivity, or alternatively, by averaging the resistivities computed from the dual-transmitter measurements with the resistivities computed from the dual-receiver measurements. The resulting reduction in borehole rugosity effects is shown in FIG. 4a. In addition to borehole rugosity effects, the compensated apparatus illustrated in FIG. 4 also removes vertical response asymmetries typically associated with an uncompensated device. This asymmetry shows up at formation bed boundaries wherein the log of measured resistivity as a function of depth from an uncompensated tool will have a different character as the tool enters a conductive bed, when compared to a log as the tool exits a conductive bed (FIG. 4b).

Figure 4C:
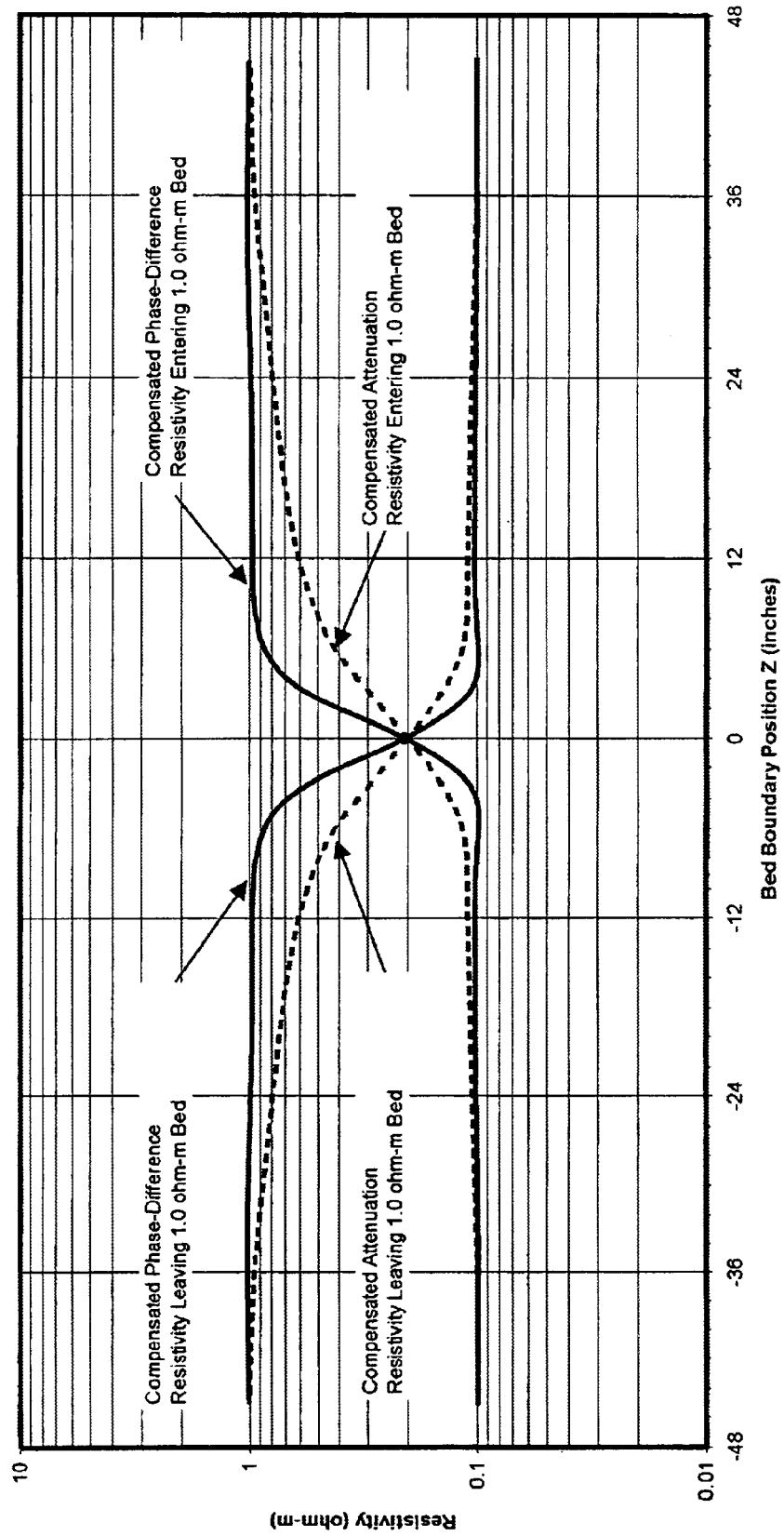
FIG. 4c illustrates the symmetrical vertical response of a compensated tool.

This asymmetrical vertical response effect can be explained by examining the uncompensated measurements from receiver pair 16. As receiver pair 16 of the device enters a resistive bed boundary from the top the respective transmitter has already penetrated the bed. At this position a larger portion of the propagating electromagnetic wave is contained in the resistive bed. The opposite happens at the bottom bed boundary as the respective transmitter is no longer embedded in the resistive bed as receiver pair 16 transverses the lower bed boundary. In this manner a smaller portion of the propagating electromagnetic wave is contained the resistive bed at this position, and this geometrical effect causes the resistivity log to have a different shape at the top and bottom of formation bed boundaries. By using both receiver pair 16 and transmitter pair 14 measurements, the effects of this vertical response asymmetry are averaged to provide a measurement responding to bed boundaries in a consistent symmetrical fashion regardless of the tool geometry as the tool traverses the bed boundary (FIG. 4c).

Receiver and transmitter errors (removed with a standard borehole compensated tool) are still present. The dual-receiver measurements from receiver pair 16 contain receiver errors and the dual-transmitter measurements from transmitter pair 14 contains transmitter errors, however such errors can be compensated with electronic features incorporated in the design of the apparatus as described later in this disclosure.

One embodiment of a depth-aligned compensated propagation wave resistivity tool 20 is shown in FIG. 5. Four parameters can describe the location and layout of the tool 20 antennas. These four parameters are the total number of transmitters (J), the total number of receivers (K), the spacing between upper transmitter TxJ and the lower receiver Rx1 ($Z_{min}$), and the spacing between adjacent transmitter and receiver antennas. Four different tool layout examples are illustrated in FIGS. 6 through 9, wherein different combinations of receivers and transmitters are illustrated.

As described above the transmitters are located below the receivers. However, configurations placing the receivers below the transmitters can be used and will have the same response as a device positioning the transmitters below the receivers. Placement of the transmitters and receivers above or below the other depends on the desired implementation.

Figure 10:
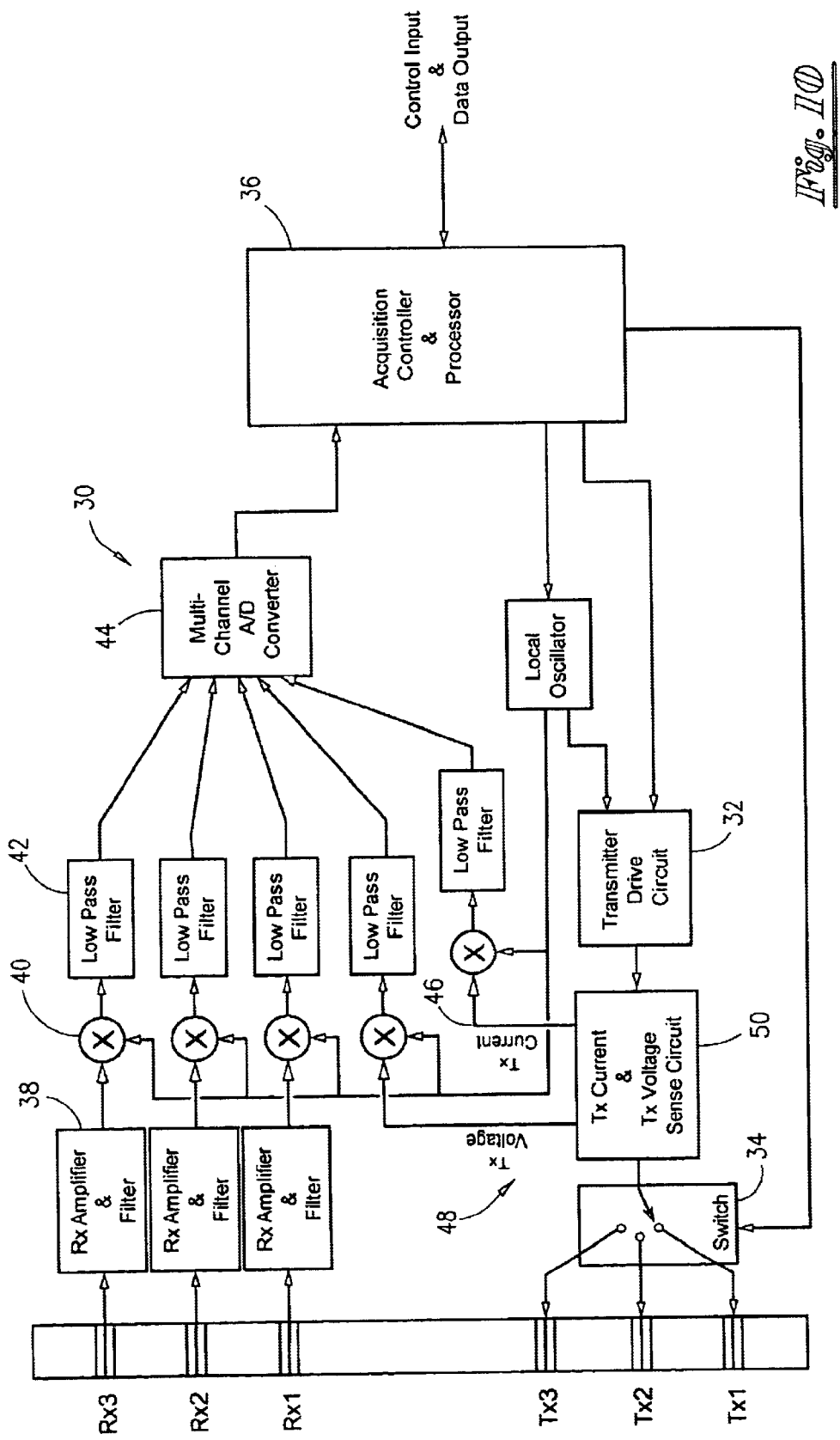
FIG. 10 illustrates a block diagram for a depth-aligned compensated tool.

The method of depth-aligned compensation previously described can be extended to other possible tool layouts by properly aligning in depth the dual-receiver and dual-transmitter data of equal spacing. The total number of different depths of investigation provided by this method is equal to the total number of unique transmitter to receiver-pair spacings ($N_{TRR}$). A block diagram of a 3-transmitter, 3-receiver version of a depth-aligned compensated propagation wave resistivity tool 30 is illustrated in FIG. 10. Tool 30 contains a single transmitter circuit 32 that drives one of three different transmitter antenna Tx1, Tx2, and Tx3 via an electronic switch 34. The transmitters are typically selected in sequence under the control of an acquisition routine programmed in acquisition controller and processor 36. Three sets of similar receiver electronics 38 acquire the data from the three receiver antennas Rx1, Rx2 and Rx3 simultaneously. A local oscillator provides the frequency references for both the transmitter and receiver mixer circuits 40. After the mixer 40, the receiver signals are passed through low pass filters 42 and then on to a multi-channel analog-to-digital converter 44.

Acquisition controller and processor block 36 directs the sequencing and timing of the acquisition electronics and also acquires and processes the measurement data. An interface to accept commands from and pass data to the user is also provided by block 36. Such an interface can connect to a telemetry system (not shown) to provide a means to acquire and transmit data in real time such as in the determination of formation resistivity while drilling.

Figure 11:
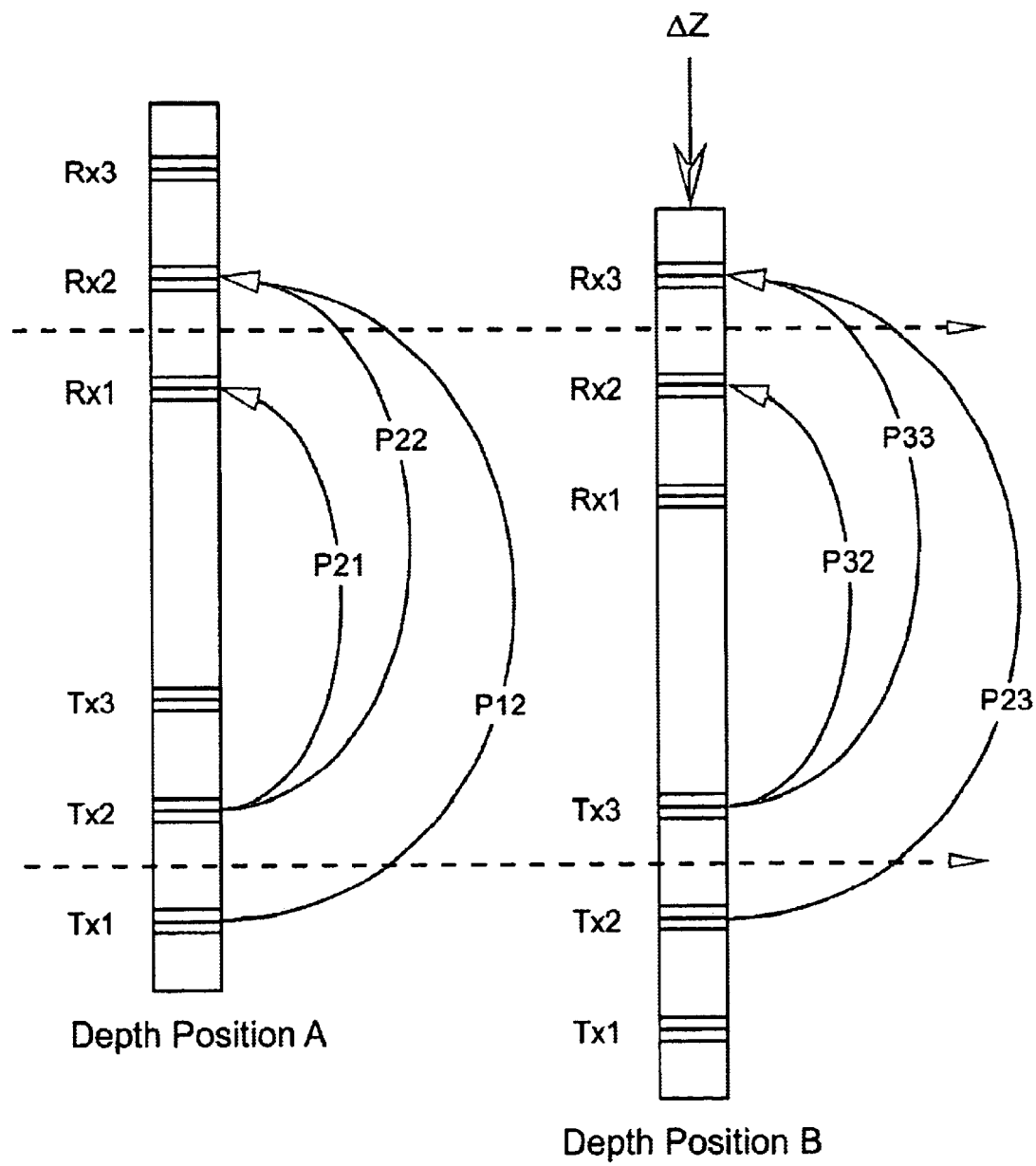
FIG. 11 illustrates the depth alignment process for electronic error compensation.

Although depth-aligned compensation reduces the effect of borehole rugosity and provides a symmetrical vertical response, the electronic errors associated with the transmitters and receivers preferably use an additional compensation method. This electronic compensation method involves measuring the transmitter errors directly with an electronic circuit and calculating the receiver errors by depth aligning and comparing equivalent propagation measurements from different transmitter-receiver pairs. This process is illustrated in FIG. 11 for a three-transmitter and three-receiver tool. In this example the electronic calibration only needs four quantities—the differential propagation measurement error of the two close spaced receiver pairs and the differential propagation measurement error of the two close spaced transmitter pairs. Typically these differential propagation measurements are attenuation and phase difference, but this calibration process can also be applied to other measurements. Referring to FIG. 11, the transmitter propagation measurements for Tx1 and Tx2 using receiver Rx1 at depth position A can be written as $$A_{11}=E_{Tx1}+P11_A+E_{Rx1},$$

$$A_{21}=E_{Tx2}+P21_A+E_{Rx1},$$

where $E_{Tx1}$ and $E_{Tx2}$ are the errors associated with transmitters Tx1 and Tx2 respectively and $E_{Rx1}$ is the error associated with receiver Rx1. The dual transmitter propagation measurement for Tx1 and Tx2 using Rx1 can be written as $$M_{TM}=A21-A11=(E_{Tx2}+P21_A+E_{Rx1})-(E_{Tx1}+P11_A+E_{Rx1})$$

or $$M_{TM}=(P21_A-P11_A)+(E_{Tx2}-E_{Tx1}). \quad (1)$$

The quantity ($P21_A-P11_A$) is the differential propagation property to be measured without error. Error associated with receiver Rx1 cancels and the error remaining, ($E_{Tx2}-E_{Tx1}$), is due to transmitters Tx1 and Tx2. In this example, $M_{TM}$ is the medium-spaced differential propagation measurement. Similar derivations of the short-spaced, $M_{TS}$ and long-spaced, $M_{TL}$, dual-transmitter propagation measurements can be made. $M_{TS}$ and $M_{TL}$ can be written as $$M_{TS}=A31-A21=(P31_A-P21_A)+(E_{Tx3}-E_{Tx2}) \quad (2)$$

and $$M_{TL}=A23-A13=(P23_A-P13_A)+(E_{Tx2}-E_{Tx1}). \quad (3)$$

As shown in equations 1, 2 and 3, the errors in $M_{TS}$, $M_{TM}$ and $M_{TL}$ are all differential transmitter errors.

These differential transmitter errors are directly measured in the tool by sampling the transmitter current 46 and the transmitter voltage 48 and by deriving correction factors for data acquired with each transmitter pair 14. Outputs from transmitter sense circuit 50 are treated in a similar fashion to the receiver signals and passed to analog-to-digital converter 44. The differential transmitter errors are then calculated by forming the difference of certain characteristics of the sampled transmitter signals. For instance, the differential transmitter phase errors can be calculated from the phase difference of the sampled signals and the differential transmitter attenuation errors can be calculated from the difference of the amplitudes of the sampled transmitter signals. Since these transmitter sense outputs are processed with the same circuits, any systematic errors associated with the acquisition circuits are removed when these differential corrections are calculated. After the differential transmitters errors have be calculated from the sampled transmitter signals such errors can be subtracted from $M_{TS}$, $M_{TM}$ and $M_{TL}$ to remove errors associated with the transmitter elements of the system.

In a similar manner, expressions for the dual-receiver propagation measurements can be derived. Referring to FIG.

11, the receiver propagation measurements for Rx1 and Rx2 using receiver Tx2 at depth position A can be written as $$A_{22}=E_{Tx2}+P22_A+E_{Rx2},$$

$$A_{21}=E_{Tx2}+P21_A+E_{Rx1},$$

The dual-receiver propagation measurement, $M_{RM}$, can then be written as $$M_{RM}=A21-A22=(E_{Tx2}+P21_A+E_{Rx1})-(E_{Tx2}+P22_A+E_{Rx2})$$

or $$M_{RM}=(P21A-P22A)+(E_{Rx1}-E_{Rx2}). \quad (4)$$

Similar derivations of the short-spaced, $M_{RS}$ and long-spaced, $M_{RL}$, dual-receiver propagation measurements can be made. $M_{RS}$ and $M_{RL}$ can be written as $$M_{RS}=(P31A-P32A)+(E_{Rx1}-E_{Rx2}). \quad (5)$$

and $$M_{RL}=(P12A-P13A)+(E_{Rx2}-E_{Rx3}). \quad (6)$$

As shown in equations 4, 5 and 6, the errors in $M_{RS}$, $M_{RM}$ and $M_{RL}$ are all differential receiver errors.

The differential receiver errors can be determined with the use of the transmitter error measurements described above and with a process that involves depth aligning and comparing equivalent propagation measurements from different transmitter-receiver pairs. Referring again to FIG. 11, the tool body has been moved by amount ΔZ from depth position A to depth position B. As illustrated in FIG. 11, a number of propagation paths at position A are equivalent to other propagation paths at position B. For instance, P11$_A$ is equivalent to P22$_B$, P12$_A$ is equivalent to P23$_B$, etc. If no transmitter or receiver errors are present in the system, the measurement A11 for propagation path P11$_A$ will be equal to the measurement B11 for propagation path P22$_B$. From the above references to transmitter errors, the measurement A11 can be written as $$A_{11}=E_{Tx1}+P11_A+E_{Rx1},$$

Similarly, the expression for B22 can be written as $$B_{22}=E_{Tx2}+P22_B+E_{Rx2},$$

Forming the difference of A11 and B22 results in $$A11-B22=(E_{Tx1}+P11_A+E_{Rx1})-(E_{Tx2}+P22_B+E_{Rx2})$$

which simplifies to $$A11-B22=(E_{Rx1}-E_{Rx2})+(E_{Tx1}-E_{Tx2})+(P11_A-P22_B).$$

The term (P11$_A$–P22$_B$) is equal to zero since the propagation paths are identical. This permits the differential receiver error to be expressed as $$(E_{Rx1}-E_{Rx2})=(A11-B22)+(E_{Tx2}-E_{Tx1})$$

Similarly, the remaining differential receiver error can be expressed as $$(E_{Rx2}-E_{Rx3})=(A22-B33)+(E_{Tx3}-E_{Tx2}).$$

The invention permits determination of all four of the required differential measurement errors, including the two differential-transmitter measurement errors and the two differential-receiver measurement errors. With the differential errors defined, the differential-transmitter errors can be subtracted from the appropriate dual-transmitter measurements, $M_{TS}$, $M_{TM}$ and $M_{TL}$ and the differential-receiver errors from the appropriate dual-receiver measurements, $M_{RS}$, $M_{RM}$ and $M_{RL}$, thereby providing propagation measurements free of the errors associated with the transmitter and receiver elements of the system.

Other differential errors can be identified, such as the differential receiver error ($E_{Rx1}$–$E_{Rx2}$) derived from the measurements A11 and B22. An alternate relationship using A21 and B32 can be used to obtain another expression for ($E_{Rx1}$–$E_{Rx2}$) as follows:

$$(E_{Rx1}-E_{Rx2})=(A21-B32)+(E_{Rx3}-E_{Tx2}).$$

Similar alternate versions of ($E_{Rx2}$–$E_{Rx3}$) can also be derived, thereby reducing noise in the differential errors by averaging all of the possible determinations of each differential error. In addition, noise in the differential errors can be further reduced by averaging the determined values over depth since they will not vary directly as a function of depth. This occurs because the primary mechanism for causing drifts in the differential errors is time, temperature or pressure and not depth.

The controller (which can include downhole or surface located components) is capable of producing a compensated resistivity measurement of the geologic formation by averaging uncompensated dual-receiver resistivity measurements with uncompensated dual-transmitter resistivity measurements of the geologic formation taken from two selected locations within the borehole. This averaging provides a compensated resistivity measurement with symmetrical vertical response and reduced effects from borehole rugosity. The controller can also be capable of producing a compensated resistivity measurement of the geologic formation by averaging dual-receiver propagation measurements (such as attenuation and phase difference) with dual-transmitter propagation measurements of the geologic formation taken from two selected locations within the borehole. This averaging results in a compensated resistivity measurement with a symmetrical vertical response and reduced effects from borehole rugosity.

In the example shown in FIG. 11, compensation of errors from the transmitting and receiving elements of the system can be made by measuring currents and voltages used by first, second and third transmitters, by measuring currents and voltages of the electrical signals generated by the first, second and third receivers, and by operating the controller to derive corrections for the transmitter propagation errors from the differences between such current and voltage measurements. In addition, the controller can be operated to derive receiver propagation errors from the corrections for the transmitter propagation errors and from depth aligned receiver propagation measurements.

The invention has significant advantages over prior art tools. Such advantages include a shorter tool length, multiple depths of investigation with fewer antennas, compensation for the asymmetrical vertical response of electromagnetic wave tools, compensation for borehole rugosity effects, and compensation for the errors caused by the transmitter and receiver elements of the apparatus.

Although the invention has been described in terms of certain preferred embodiments, it will become apparent to those of ordinary skill in the art than modifications and improvement can be made to the inventive concepts herein within departing from the scope of the invention. The embodiments shown herein are merely illustrative of the inventive concepts and should not be interpreted as limiting the scope of the invention.

What is claimed is:

1. A system for evaluating a geologic formation property proximate to a borehole through such formation, comprising:
   a tool body moveable through the borehole;
   a first transmitter engaged with said tool body for generating a signal into the geologic formation;
   a second transmitter engaged with said tool body proximate to said first transmitter for generating a signal into the geologic formation;
   a first receiver engaged with said tool body for receiving signals generated by said first and second transmitters; and
   a second receiver engaged with said tool body proximate to said first receiver for receiving signals generated by said first and second transmitters, and wherein said first and second receivers are positioned as a pair and said first and second transmitters are positioned as a pair and wherein said received signals contain propagation properties representative of the formation property;
   a controller for processing signals received by said first and second receivers;
   means, operatively associated with said controller, for obtaining dual receiver measurements from the propagation properties;
   means, operatively associated with said controller, for obtaining dual transmitter measurements from the propagation properties wherein said controller is producing a compensated resistivity measurement of the geologic formation by averaging uncompensated dual-receiver resistivity measurements with uncompensated dual-transmitter resistivity measurements of said geologic formation taken from two selected locations within the borehole.

2. A system as recited in claim 1, wherein said dual receiver means comprises:
   means for measuring the difference between the propagation properties from the first transmitter to the first receiver and the second receiver;
   means for measuring the difference between the propagation properties from the second transmitter to the first receiver and the second receiver; and wherein said dual transmitter means comprises;
   means for measuring the difference between the propagation properties of the first transmitter to the first receiver and the propagation properties of the second transmitter to the first receiver; and
   means for measuring the difference between the propagation properties of the first transmitter to the second receiver and the propagation properties of the second transmitter to the second receiver.

3. A system as recited in claim 2, wherein the spacing between said first and second transmitters is equal to the spacing between said first and second receivers.

4. A system as recited in claim 1, wherein said controller is capable of producing a compensated resistivity measurement of the geologic formation by averaging dual-receiver propagation measurements with dual-transmitter propagation measurements of said geologic formation taken from two selected locations within the borehole.

5. A system as recited in claim 1, further comprising at least one additional transmitter located proximate to said first and second transmitters and at least one additional receiver located proximate to said first and second transmitters.

6. A system as recited in claim 5, wherein said dual receiver measurement means utilize the additional receiver and the additional transmitter to obtain additional dual transmitter measurements and wherein said dual transmitter measurement means utilizes the additional receiver and the additional transmitter to obtain additional dual receiver measurements.

7. An apparatus for evaluating a geologic formation property proximate to a borehole through such formation, comprising:
   a tool body moveable through the borehole;
   a first transmitter engaged with said tool body for generating an electromagnetic wave into the geologic formation;
   a second transmitter engaged with said tool body proximate to said first transmitter for generating an electromagnetic wave into the geologic formation;
   a first receiver engaged with said tool body for receiving electromagnetic wave energy generated by said first and second transmitters and for generating electrical signals representing propagation properties of the electromagnetic wave energy;
   a second receiver engaged with said tool body proximate to said first receiver for receiving electromagnetic wave energy generated by said first and second transmitters and for generating electrical signals representing propagation properties of the electromagnetic wave energy; and
   a controller for processing the electrical signals generated by said first and second receivers to indicate the compensated resistivity of the geologic formation, and wherein the controller contains means for obtaining a dual receiver measurement from the propagation properties and means for obtaining a dual transmitter measurement from the propagation properties wherein the dual receiver means comprises: means for measuring the difference of the propagation properties from the first transmitter to the first receiver and the second receiver; means for measuring the difference of the propagation properties from the second transmitter to the first receiver and the second receiver; and wherein said dual transmitter means comprises; means for measuring the difference between the propagation properties of the first transmitter to the first receiver and the propagation properties of the second transmitter to the first receiver; and means for measuring the difference between the propagation properties of the first transmitter to the second receiver and the propagation properties of the second transmitter to the second receiver.

8. An apparatus as recite in claim 7, wherein said first and second transmitters are located in the borehole at an elevation below said first and second receivers, and wherein the spacing between said first and second transmitters is equal to the spacing between said first and second receivers.

9. An apparatus as recited in claim 7, further comprising at least one additional transmitter located proximate to said first and second transmitters.

10. An apparatus as recited in claim 7, further comprising at least one additional receiver located proximate to said first and second receivers.

11. A method for evaluating a geologic formation property proximate to a borehole through such formation, comprising the steps of:
    deploying a tool body in the borehole, wherein the tool body includes a first transmitter, a second transmitter proximate to said first transmitter, a first receiver, a second receiver proximate to said first receiver, wherein said first and second transmitters are positioned as a pair and said first and second receivers are positioned as a pair, and a controller associated with said first and second receivers;

generating electromagnetic wave energy from said first transmitter at a selected location in the borehole;

generating electromagnetic wave energy from said second transmitter at a selected location in the borehole;

operating said first and second receivers in response to the electromagnetic wave energy generated by said first and second receivers to generate electrical signals representing propagation properties of said electromagnetic wave energy; and transmitting said electrical signals to said controller wherein the step of operating said first and second receivers includes: measuring the difference of the propagation property from the first transmitter to the first receiver and the second receiver; measuring the difference of the propagation property from the second transmitter to the first receiver and the second receiver; measuring the difference between the propagation property of the first transmitter to the first receiver and the propagation property of the second transmitter to the first receiver; and measuring the difference between the propagation property of the first transmitter to the second receiver and the propagation property of the second transmitter to the second receiver.

12. A method as recited in claim 11, further comprising the step of operating said controller to convert said difference between the electrical signals into a measurement representing resistivity of the geologic formation.

13. A method as recited in claim 11, further comprising the step of operating said controller to determine the difference between signals generated by said first receiver from said first transmitter, and said first receiver from said second transmitter.

14. A method as recited in claim 13, further comprising the step of operating said controller to determine the difference between signals generated by said second receiver from said first transmitter, and said second receiver from said second transmitter.

15. A method as recited in claim 14, further comprising the steps of generating said signals when said tool body is at different locations within the borehole and of operating said controller to determine an average measurement of geologic formation resistivity.

16. A method as recited in claim 14, further comprising the steps of generating said signals when said tool body is at different locations within the borehole and of operating said controller to determine an average of propagation measurements through the geologic formation.

17. A method as recited in claim 11, further comprising the steps of measuring currents and voltages generated by said first and second transmitters, of measuring currents and voltages of said electrical signals generated by said first and second receivers, and of operating said controller to derive corrections for the transmitter propagation errors from the differences between such current and voltage measurements.

18. A method as recited in claim 17, further comprising the step of operating said controller to derive receiver propagation errors from said corrections for the transmitter propagation errors and from depth aligned receiver propagation measurements.

* * * * *